United States Patent Office 2,812,245
Patented Nov. 5, 1957

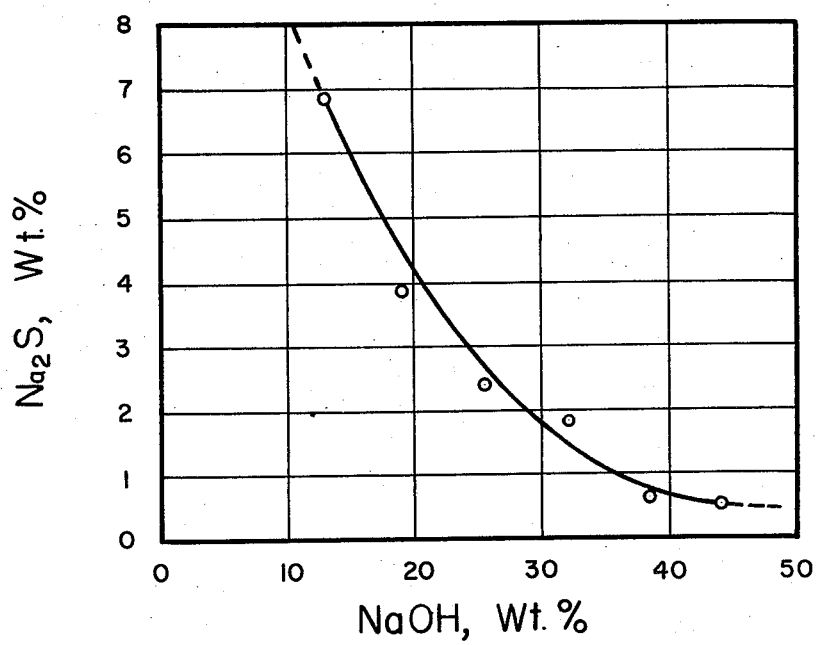
SOLUBILITY OF SODIUM SULFIDE
IN SODIUM HYDROXIDE AT 25°C.
*INVENTORS*
GEORGE S. HAINES
FRANK D. HEINDEL
BY ROY T. OSBORNE

2,812,245
SODIUM SULFIDE RECOVERY

George S. Haines, St. Albans, and Frank D. Heindel, South Charleston, W. Va., and Roy T. Osborne, Rock Springs, Wyo., assignors to Food Machinery and Chemical Corporation, New York, N. Y., a corporation of Delaware Application February 15, 1954, Serial No. 410,273

6 Claims. (Cl. 23—302)

This invention relates to the recovery of sodium sulfide from aqueous solutions containing substantial proportions of sodium sulfide and sodium hydroxide, and more particularly to the recovery of sodium sulfide from the mother liquor remaining after crystallizing and separating barium hydroxide octahydrate, made by the reaction between barium sulfide and sodium hydroxide.

This source of mother liquor is described in a separate patent application, disclosing and claiming a novel method of preparing pure, crystalline barium hydroxide octahydrate by the reaction between sodium hydroxide and barium sulfide.

This invention may also be utilized in other instances where sodium sulfide and sodium hydroxide occur together in substantial proportions in aqueous solutions, as in (a) purification of sodium sulfide produced by the reduction of sodium sulfate with carbon; (b) production of sodium sulfide from hydrogen sulfide and sodium hydroxide; and (c) scrubbing hydrogen sulfide out of gas streams with sodium hydroxide, crystallizing out sodium sulfide and recycling the caustic.

The process of this invention should not be confused with prior art processes for the purification of sulfide solutions, wherein sodium hydroxide is added in low concentration to remove iron and related impurities.

For economic reasons, it is desired to recover the sodium sulfide in a salable form, and to recycle the excess caustic for other uses, such as the metathesis of additional barium sulfide. However, the alkali cannot be used for this latter purpose with a high sulfide content, because of the very critical and detrimental effect of sulfide on the crystallization of pure barium octahydrate. Therefore it is necessary to separate and recover the hydroxide and sulfide, whether the individual materials are to be used for this or various other uses to which they might be put, but which would be deleteriously affected by the presence of the other substance.

We have been unable to discover any reference to a remedy for this problem in the literature, and the process defined hereinafter appears to be a novel development in its entirety, the utility of which is not limited to its use in the instant situation.

It is a principal object of this invention to provide a novel and practical method for the separation and recovery of sodium sulfide and sodium hydroxide from aqueous solutions containing substantial proportions of sodium sulfide and sodium hydroxide.

Another object of this invention is to provide a practical method for the recovery of sodium sulfide and sodium hydroxide from the mother liquor resulting from the preparation of barium hydroxide octahydrate, by the reaction between barium sulfide and sodium hydroxide.

Other objects will be apparent to those skilled in the art from a consideration of the disclosure herein.

We have discovered a novel process for separating and recovering sodium sulfide from a solution of sodium hydoxide, which comprises evaporating the solution, at atmospheric or reduced pressure, to a suitable sodium hydroxide concentration, cooling to crystallize sodium sulfide, and separating the crystals by centrifuging or other means. The recovery of sodium sulfide appears to be at a maximum from about a 42 wt. percent sodium hydroxide solution. However, we prefer to concentrate to slightly lower levels, i. e. to about a 35–40% range, to take advantage of the improved separation of the mother liquor and obtain a better balance between yield and purity. Still lower concentrations may be used with correspondingly lower yields, as may be noted by a consideration of the graph in the figure of the drawing, showing the solubility at 25° C. of sodium sulfide in sodium hydroxide solution.

The yield of sodium sulfide increases as the final crystallization temperature is decreased and we prefer to cool to a temperature of about 20–30° C., preferably about 25° C., where the solubility of sodium sulfide in sodium hydroxide is less than 1.0 wt. percent at concentrations of sodium hydroxide above about 36%.

The sodium sulfide separated from the concentrated sodium hydroxide contains appreciable concentrations of the latter, which must be removed to provide a salable product. This is difficult to accomplish because of the solubility of sodium sulfide in water and the low melting point of the nonahydrate, which is the stable hydrate below about 50° C. The presence of impurities, such as the sodium hydroxide here, lowers this melting point several degrees in some cases.

Dissolution of sodium sulfide can be minimized by washing with a concentrated solution of sodium sulfide instead of water. However, the sodium sulfide separated from the concentrated sodium hydroxide is only partially hydrated, and tends to hydrate further upon washing. The heat of hydration may be sufficient to raise the temperature of the cake above the melting point of the final product (ca. 45–50° C.). This causes at least two difficulties. First, the surface of the cake tends to fuse, preventing subsequent washing. Secondly, the wash liquor leaving the cake is supersaturated and, as it cools, tends to deposit sodium sulfide in the filter and discharge conduit.

We have found several novel means of overcoming the difficulties involved in washing the sodium hydroxide out of the sodium sulfide:

(1) If the dewatered sodium sulfide is added to water, or preferably a concentrated sodium sulfide solution, with cooling, the resulting slurry can be readily filtered without fusion of the cake, or post-precipitation from the filtrate.

(2) It was also found that the cake could be washed satisfactorily without reslurrying, if it were cooled and washed with cold water, or preferably a cold, concentrated solution of sodium sulfide, at such a rate that the temperature of the cake did not attain the fusion point.

(3) It was also observed that the dewatered sodium sulfide had a melting point of about 94° C. and a water content corresponding approximately to the pentahydrate. It was then observed that if the cake and wash liquor, i. e. water, or preferably a concentrated sodium sulfide solution, were heated above 50° C., where the nonahydrate will not form, but not as high as 94° C., where the dewatered product would melt, the cake could be washed without any hydration, fusion of the cake or post precipitation of sodium sulfide.

The invention will be better understood from a consideration of the following examples, which are illustrative only, and not to be considered as limiting the scope of the invention.

Example 1

A solution, obtained as a mother liquor from the preparation of barium hydroxide octahydrate, and containing substantial porportions of sodium sulfide and sodium hydroxide, was evaporated until it contained 35.1% sodium hydroxide and 4.9% sodium sulfide, and then cooled from about 60° C. to 25 C. A crop of crystals was obtained containing 4.7% sodium hydroxide, and 36.0% sodium sufide, in 81.5% yield. (The balance of the crystal weight percentage is largely water of hydration.)

*Example 2*

A similar solution was evaporated until it contained 42.6% sodium hydroxide and 6.0% sodium sulfide, and then cooled from 65° C. to 25° C. Crystals analyzing 7.2% sodium hydroxide and 39.0% sodium sulfide were obtained, in 98.6% yield.

*Example 3*

75 g. of dewatered crystals analyzing 41.6% sodium sulfide and 4.1% sodium hydroxide were added to 375 ml. of saturated sodium sulfide solution at 20° C. to 25° C., and stirred for about 10 minutes. After centrifuging, crystals analyzing 31.8% sodium sulfide and 0.07% sodium hydroxide were obtained. Theory for nonahydrate is 32.5% sodium sulfide.

*Example 4*

149 g. of dewatered crystals on a centrifuge were washed with a total of 134 ml. of saturated sodium sulfide solution, applied in fine spray. The temperature of the basket was maintained between 10° C. and 28° C., and that of the wash solution at about 15° C. No fusing or crusting occurred and the washed product analyzed 31.9% sodium sulfide and 0.2% sodium hydroxide. Theory for nonahydrate is 32.5% sodium sulfide.

*Example 5*

Sodium sulfide was crystallized out of 40% sodium hydroxide by cooling and centrifuging at 25° C. The dewatered product analyzed 40% sodium sulfide, 6.4% sodium hydroxide and the rest water. After heating the cake to about 70° C. and washing with water at 70° C., the product analyzed 43% sodium sulfide, 0.8% sodium hydroxide and the rest water. However, during the washing there was no fusing or crusting, such as was observed at lower temperatures, and the centrifuge cake retained its porous, friable character. Moreover the washed material corresponded to 97.5% $Na_2S \cdot 5.5 H_2O$. The theory for the 5.5 hydrate is 44.1% sodium sulfide.

The sodium sulfide hydrate, other than the nonahydrate, referred to herein as corresponding approximately to the pentahydrate has the formula $Na_2S \cdot 5.5 H_2O$, as noted in Example 5 above. This hydrate is well-known in art, and is in fact a commercially available product. It is preferred over other sodium sulfide hydrates because of its higher melting point and consequent greater stability.

From a consideration of the foregoing description and illustrative embodiments of this invention, it will be apparent to those skilled in the art that this invention is capable of variations, though still realizing the advantages of the disclosure herein, but it is intended that all such variations fall within the scope of the appended claims.

That which is claimed as new is:

1. The method of separating and recovering sodium sulfide from an aqueous solution containing substantial proportions of sodium sulfide and sodium hydroxide, comprising: evaporating the solution to a sodium hydroxide concentration within the range of about 30 to 50 wt. percent; cooling the solution sufficiently to effect substantial crystallization of sodium sulfide; and separating the crystals from the solution.

2. The process of claim 1, wherein the evaporation is effected to a concentration of about 40 wt. percent of sodium hydroxide.

3. The process of claim 1, wherein the evaporated solution is cooled to a temperature of about 25° C.

4. The process of claim 1, wherein the sodium sulfide separated from the solution is purified by washing while maintaining the temperature of the sodium sulfide below about 50° C.

5. The process of claim 1, wherein the sodium sulfide separated from the solution is purified by preparing from it an aqueous slurry while maintaining the temperature of the slurry below the melting point of the sodium sulfide, and thereafter separating the sodium sulfide from the slurry.

6. The process of claim 1, wherein the sodium sulfide separated from the solution is purified by washing while maintaining the temperature of the sodium sulfide within the range of about 50° C. to about 90° C.

References Cited in the file of this patent

UNITED STATES PATENTS

| Number | Name | Date |
|---|---|---|
| 1,953,839 | Waddell | Apr. 3, 1934 |
| 2,127,496 | Waldeck | Aug. 23, 1938 |
| 2,178,694 | Muskat | Nov. 7, 1939 |